(12) United States Patent
Guo et al.

(10) Patent No.: US 11,477,001 B2
(45) Date of Patent: Oct. 18, 2022

(54) DATA CONCENTRATION SYSTEM FOR INNER DETECTOR OF OIL-GAS PIPELINE, AND TIMING CONTROL METHOD

(71) Applicant: TSINGHUA UNIVERSITY, Beijing (CN)

(72) Inventors: Jing-Bo Guo, Beijing (CN); Tie-Hua Hu, Beijing (CN); Guan-Yu Piao, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 300 days.

(21) Appl. No.: 16/646,140

(22) PCT Filed: Dec. 4, 2017

(86) PCT No.: PCT/CN2017/114487
§ 371 (c)(1),
(2) Date: May 29, 2020

(87) PCT Pub. No.: WO2019/047398
PCT Pub. Date: Mar. 14, 2019

(65) Prior Publication Data
US 2020/0304279 A1    Sep. 24, 2020

(30) Foreign Application Priority Data

Sep. 11, 2017 (CN) .......................... 201710811993.4

(51) Int. Cl.
*H04L 5/14* (2006.01)
*F17D 5/00* (2006.01)
(Continued)

(52) U.S. Cl.
CPC ............... *H04L 5/14* (2013.01); *F17D 5/005* (2013.01); *G08C 19/24* (2013.01); *H04L 67/12* (2013.01); *H04L 69/04* (2013.01)

(58) Field of Classification Search
CPC . H04L 5/14; H04L 67/12; H04L 69/04; F17D 5/005; F17D 5/06; F17D 5/00; G08C 19/24; H04B 1/38
See application file for complete search history.

(56) References Cited

U.S. PATENT DOCUMENTS 7,385,692 B1 * 6/2008 Nguyen ..................... G01J 3/28
356/301
8,665,082 B2 * 3/2014 Glenn ................... H04W 84/18
340/539.22

FOREIGN PATENT DOCUMENTS

CA        2314573 C * 9/2009 ......... F16K 37/0091

* cited by examiner

*Primary Examiner* — Kabir A Timory

(57) ABSTRACT

A data concentration system for an inner detector of an oil-gas pipeline, and a timing control method, the system includes: a multi-channel data receiving module, a data concentration module and a data transmission module. The multi-channel data receiving module is electrically connected to a plurality of probes of an inner detector and is configured to receive detection data acquired by the plurality of probes. The data concentration module is electrically connected to the multi-channel data receiving module, and is configured to receive the detection data outputted by the multi-channel data receiving module and compress the detection data. The data transmission module is electrically connected to a data storage module of the inner detector and the data concentration module respectively, and the data transmission module is configured to receive compressed detection data.

19 Claims, 5 Drawing Sheets

(51) Int. Cl.
*G08C 19/24* (2006.01)
*H04L 67/12* (2022.01)
*H04L 69/04* (2022.01)

DATA CONCENTRATION SYSTEM FOR INNER DETECTOR OF OIL-GAS PIPELINE, AND TIMING CONTROL METHOD

RELATED APPLICATIONS

The present application claims the priority of the Chinese Patent Application No. 201710811993.4, filed on Sep. 11, 2017 and titled "DATA CONCENTRATION SYSTEM FOR INNER DETECTOR OF OIL-GAS PIPELINE, AND TIMING CONTROL METHOD", and the content of the application in its entirety is incorporated by reference herein. This application is a 35 U.S.C. § 371 national application of international patent application PCT/CN2017/114487 filed on Dec. 4, 2017, the content of which is also hereby incorporated by reference.

TECHNICAL FIELD

The present disclosure relates to the field of electronic technology, and particularly to a data concentration system for an inner detector of an oil-gas pipeline and a timing control method.

BACKGROUND

Oil-gas pipelines are the lifeline for energy transportation, and their operation conditions directly affect the ecological environment, the national economy and safety. The inner detection technology and the industrialization and practical application of the inner detection equipment for metal defect of the oil-gas pipelines are of significant importance. Inner detectors for metal defect of the oil-gas pipelines include a deformation detecting robot, a magnetic flux leakage detecting robot, an eddy detecting robot, and the like.

During operation of an inner detector in a pipeline, an electronic system equipped in the inner detector is required to acquire, transmit, and store data of a plurality of sensor. As the diameter of the pipeline increases, the number of the inner detector probes distributed in a circumferential direction also increases. For an inner detector for a pipeline having a larger diameter, the number of mounted probes is usually greater than one hundred. Therefore, data to be transmitted from all probes need a concentration process by a dedicated device. Data concentration devices of conventional inner detectors have a large size, high power consumption, and poor efficiency of data concentration, which hinders the development of the inner detectors.

SUMMARY

In view of the above-mentioned technical problems, it is necessary to provide a data concentration system for an inner detector of an oil-gas pipeline, which has a smaller size and higher efficiency, and a timing control method. The system includes:

a multi-channel data receiving module, electrically connected to a plurality of probes of the inner detector, and configured to receive detection data acquired by the plurality of probes;

a data concentration module electrically connected to the multi-channel data receiving module, and configured to receive the detection data outputted by the multi-channel data receiving module and compress the detection data; and a data transmission module, electrically connected to the data concentration module and configured to receive compressed detection data from the data concentration module.

In an embodiment, the multi-channel data receiving module adopts a duplex communication mode. The multi-channel data receiving module is configured to transmit an acquisition instruction to the plurality of probes, and receive detection data acquired by the plurality of probes.

In an embodiment, the detection data received by the multi-channel data receiving module under one acquisition instruction has a length greater than or equal to 16 bits, and less than or equal to 32*16 bits.

In an embodiment, the multi-channel data receiving module includes a differential communication chip.

In an embodiment, the multi-channel data receiving module includes data receiving units. The data receiving units are provided with a plurality of data receiving channels; and each of the plurality of probes is electrically connected to a data receiving unit through the corresponding data receiving channel.

In an embodiment, the multi-channel data receiving module further includes a first self-recovery insurance module electrically connected in the corresponding data receiving unit between each of the plurality of probes and the electrical receiving channel.

In an embodiment, the data concentration module is a single-chip microcomputer or a field programmable gate array.

In an embodiment, the data concentration module compressing the detection data includes sorting and then combining the detection data; and the detection data are sorted based on sizes or numbers of the detection data.

In an embodiment, a data storage module electrically connected to the data transmission module is further included.

In an embodiment, the data transmission module is a single-channel data transmission module. The single-channel data transmission module includes a data transmission unit. The data transmission unit is electrically connected to the data storage device. A data transmission mode of the single-channel data transmission module is a duplex communication mode.

In an embodiment, the data concentration system further includes a second self-recovery insurance module electrically connected between the data storage device and the data transmission unit.

In an embodiment, the system further includes a clock management module. The clock management module is electrically connected to the multi-channel data receiving module, the data concentration module, and the data transmission module respectively, and is configured to provide a clock signal respectively for the multi-channel data receiving module, the data concentration module, and the data transmission module.

In an embodiment, the system further includes a power management module. The power management module is electrically connected to the multi-channel data receiving module, the data concentration module, and the data transmission module, and is configured to supply power to the multi-channel data receiving module, the data concentration module, and the data transmission module.

The present disclosure further provides a timing control method applied for any one of the above-mentioned data concentration systems. The method includes:

transmitting an acquisition instruction from the multi-channel data receiving module to the plurality of probes, to enable the multi-channel data receiving module acquires detection data via the plurality of probes;

transmitting a triggering instruction from the multi-channel data receiving module to the data concentration module;

receiving, by the data concentration module, the detection data from the plurality of probes according to the triggering instruction, compressing the detection data, and transmitting the compressed detection data to the single-channel data transmission module.

In the data concentration system for the inner detector of the oil-gas pipeline provided by the present disclosure, the multi-channel data receiving module can simultaneously receive the detection data from the plurality of probes. The data concentration module compresses the detection data, so that the data concentration system for the inner detector of the oil-gas pipeline of the present disclosure has smaller volume and higher data efficiency.

DETAILED DESCRIPTION OF THE EMBODIMENTS

In order to make the objects, technical solutions and advantages of the present disclosure clearer and more comprehensible, the present disclosure will be described in detail below with reference to the accompanying drawings and embodiments. It should be understood that the described embodiments are merely used for describing the technical solutions of the present disclosure, rather than limiting the technical solutions of the present disclosure.

Figure 1:
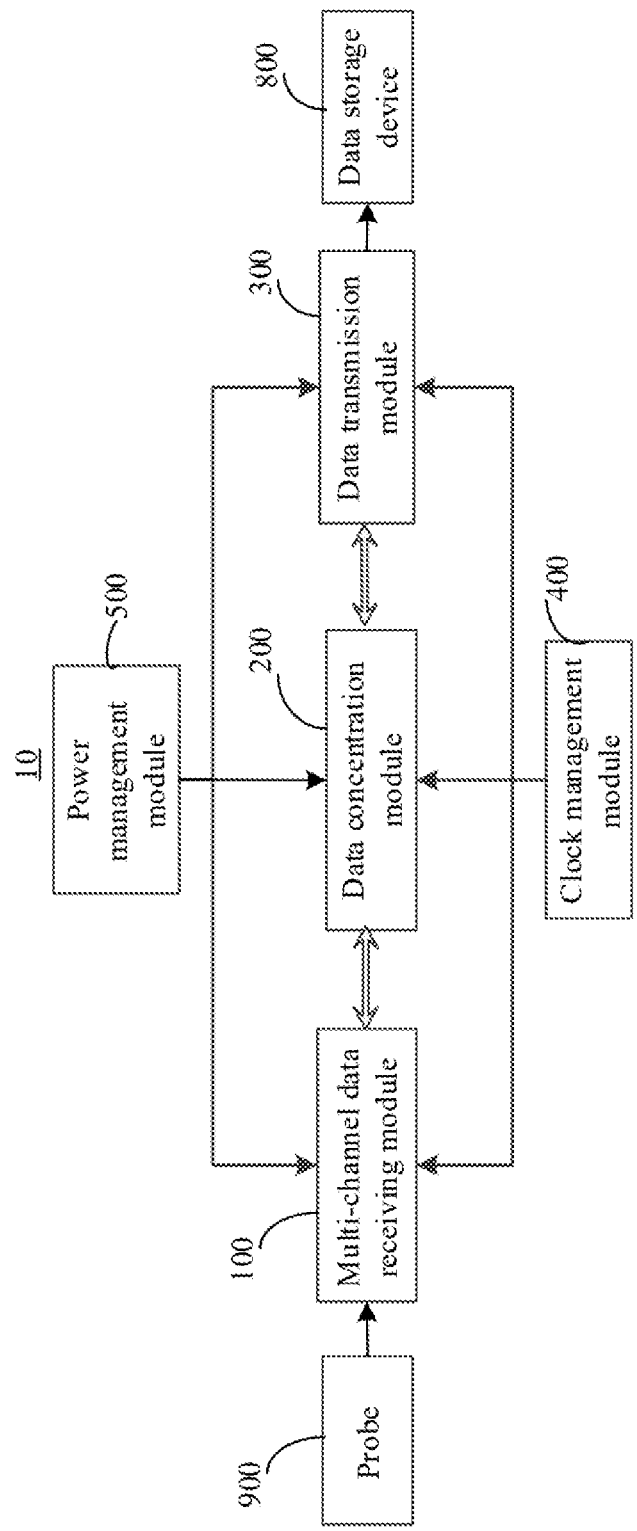
FIG. 1 shows a block diagram of a data concentration system for an inner detector of an oil-gas pipeline according to an embodiment.

Referring to FIG. 1, an embodiment of the present application provides a data concentration system 10 for an inner detector of an oil-gas pipeline, which includes a multi-channel data receiving module 100, a data concentration module 200, and a data transmission module 300. The multi-channel data receiving module 100 is electrically connected to a plurality of probes 900 of the inner detector, and is configured to receive detection data acquired by the plurality of probes. The data concentration module 200 is electrically connected to the multi-channel data receiving module 100, and is configured to receive the detection data outputted by the multi-channel data receiving module 100 and compress the detection data. The data transmission module 300 is electrically connected to the data concentration module 200. The data transmission module 300 is configured to receive the compressed detection data. The data communication mode of the multi-channel data receiving module 100 can adopt a simplex communication mode or a duplex communication mode. The duplex communication mode further includes a half-duplex communication mode or a full duplex communication mode. The multi-channel data receiving module 100 is electrically connected to the plurality of probes 900 of the inner detector. The data concentration module 200 may be a hub. The data concentration module 200 is electrically connected to the multi-channel data receiving module 100, and is configured to receive the detection data outputted by the multi-channel data receiving module 100 and compress the detection data.

In the data concentration system 10 for the inner detector of the oil-gas pipeline provided by the present application, the multi-channel data receiving module 100 can simultaneously receive the detection data from the plurality of probes 900. The data concentration module 200 compresses the detection data, so that the data concentration system 10 for the inner detector of the oil-gas pipeline of the present application has a small size and higher data efficiency.

In an embodiment, the multi-channel data receiving module 100 adopts the duplex communication mode. The multi-channel data receiving module 100 is configured to send an acquisition instruction to the plurality of probes 900 and receive the detection data acquired by the plurality of probes 900. The duplex communication mode includes sending, by the multi-channel data receiving module 100, the acquisition instruction to the plurality of probes 900 simultaneously, and receiving the detection data acquired by the plurality of probes 900 of the inner detector. The data acquired by the plurality of probes 900 have various types, for example, pipeline-wall deformation data acquired by an inner detector for deformation, and pipeline-wall defect data acquired by an inner detector for magnetic flux leakage. In an embodiment, the multi-channel data receiving module 100 adopts the RS-485 duplex communication mode, which has a transmission speed up to 20 to 50 Mbps and can effectively resist electromagnetic interference.

In an embodiment, the detection data, which are received by the multi-channel data receiving module 100 under an acquisition instruction, have a length greater than or equal to 16 bits, and less than or equal to 32*16 bits.

The multi-channel data receiving module 100 includes a differential communication chip.

In an embodiment, the data concentration system 10 for the inner detector of the oil-gas pipeline further includes a clock management module 400.

The clock management module 400 is electrically connected to the multi-channel data receiving module 100, the data concentration module 200, and the data transmission module 300 respectively, and is configured to provide a clock signal for the multi-channel data receiving module 100, the data concentration module 200, and the data transmission module 300 respectively.

In an embodiment, the data concentration system 10 for the inner detector of the oil-gas pipeline further includes a power management module 500.

The power management module 500 electrically connected to the multi-channel data receiving module 100, the data concentration module 200, and the data transmission module 300 respectively, and is configured to supply power to the multi-channel data receiving module 100, the data concentration module 200, and the data transmission module 300.

Figure 2:
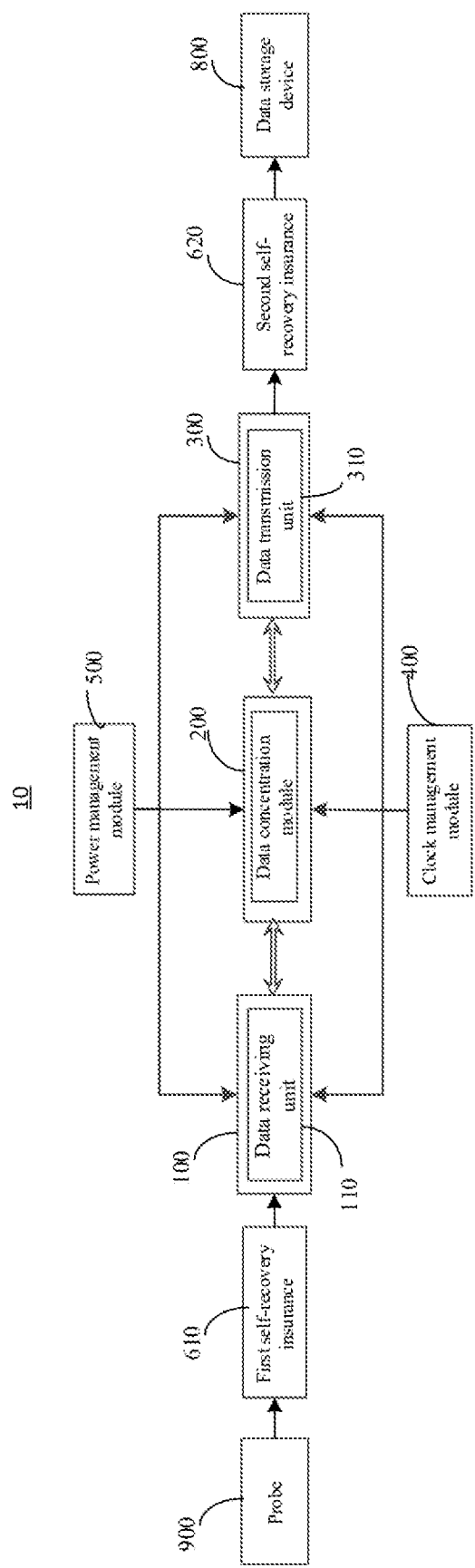
FIG. 2 shows a block diagram of the data concentration system for the inner detector of the oil-gas pipeline according to another embodiment.

Referring to FIG. 2, in an embodiment, the multi-channel data receiving module 100 includes a plurality of data receiving units 110. Each of the plurality of data receiving units 110 is correspondingly provided with a data receiving channel. Each of the plurality of probes 900 is electrically connected to the data receiving module through a corresponding data receiving channel.

In an embodiment, the data concentration system 10 for the inner detector of the oil-gas pipeline further includes a first self-recovery insurance module 610.

The first self-recovery insurance module 610 is electrically connected in the corresponding data receiving channel between the data receiving unit 110 and each of the plurality of probes 900. The first self-recovery insurance module 610 performs current protection for the data receiving unit 110, to avoid a system fault caused by a short circuit.

In an embodiment, the data concentration module 200 is a single-chip microcomputer or a field programmable gate array (FPGA). The data concentration module 200 can be a single-chip microcomputer, a field programmable gate array (FPGA), or the like. Preferably, this embodiment can adopt the field programmable gate array (FPGA) that has a stronger ability of processing logic signals, so as to ensure an accurate and quick process of data concentration.

In an embodiment, the data concentration module 200 is configured to receive the detection data outputted from the multi-channel data receiving module 100 and compress the detection data. The detection data are compressed for convenience of transmission.

In an embodiment, the data concentration module 200 compressing the detection data includes sorting and then combining the detection data. The detection data can be sorted based on sizes of the detection data or numbers of the detection data. Specifically, in an embodiment, the sorting the detection data is performed by arranging the data which the data receiving unit 110 receives correspondingly from each of the plurality of probes 900 in an order from small to large. The combing the detection data is performed by eliminating gaps between the detection data from each single probe 900 and eliminating gaps between the detection data from the plurality of probes 900. In another embodiment, as for another sorting method, the sorting the detection data is performed by arranging the detection data from the plurality of probes 900 according to the numbered sequence of the plurality of probes 900. The compressing the detection data refers to real-time compression for all detection data to eliminate each gap between detection data.

In an embodiment, the data transmission module 300 is electrically connected to the data storage module 800 of the inner detector, and transmits the received detection data to the data storage module 800 for storage.

In an embodiment, the data transmission module 300 is a single-channel data transmission module. The single-channel data transmission module includes a data transmission unit 310. The data transmission unit 310 is electrically connected to the data storage module 800. The data transmission mode of the single-channel data transmission module is a duplex communication mode.

In an embodiment, the data concentration system 10 for the inner detector of the oil-gas pipeline further includes a second self-recovery insurance module 620.

The second self-recovery insurance module 620 is electrically connected between the data storage module 800 and the data transmission unit 310. The second self-recovery insurance module 620 performs current protection for the data transmission unit 310, so as to avoid a system fault caused by a short circuit.

Figure 3:
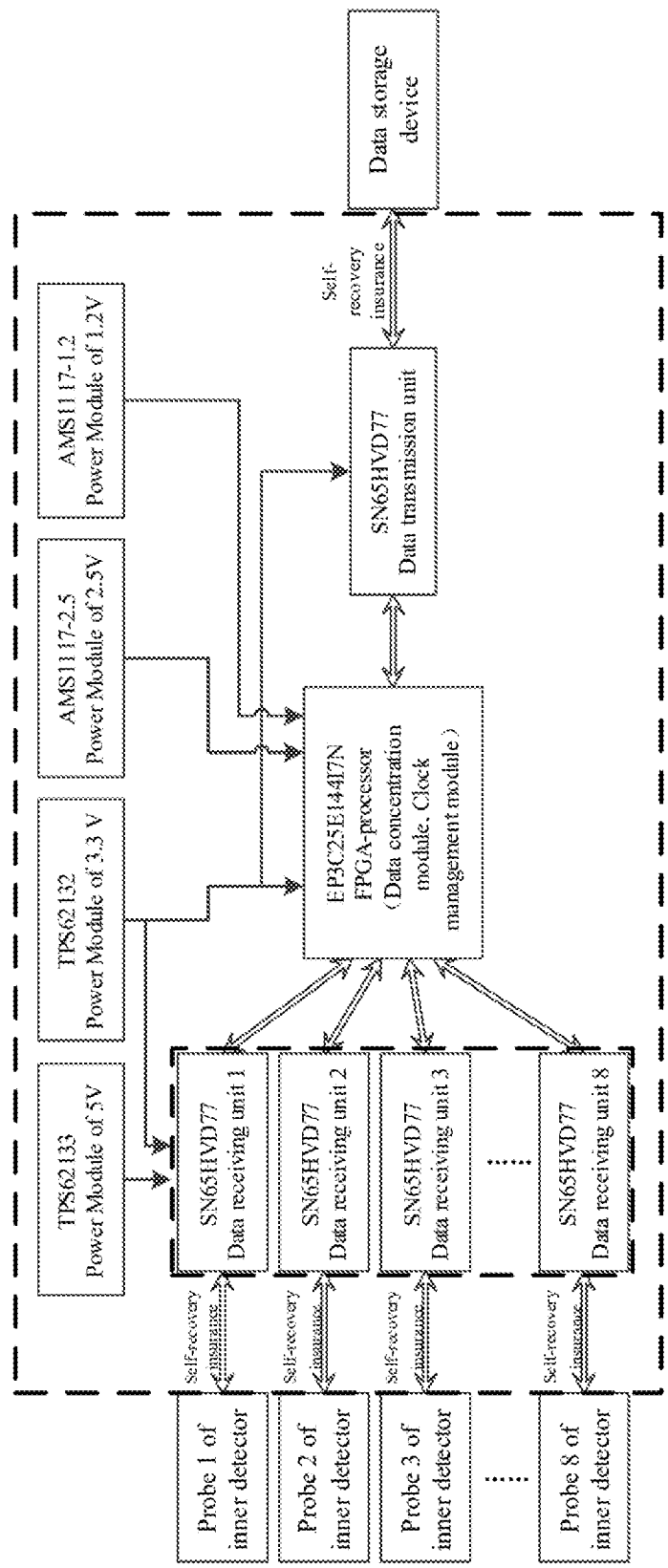
FIG. 3 shows a schematic structural diagram of the data concentration system for the inner detector of the oil-gas pipeline according to an embodiment.

Referring to FIG. 3, the data concentration system 10 for the inner detector of the oil-gas pipeline of the present application is specifically implemented as follows.

The multi-channel data receiving module 100 can adopt a chip SN65HVD77. This chip can be a RS-485 differential signaling chip, which has lower power consumption, a long transmission distance, and a transmission speed up to 20 to 50 Mbps, and can effectively resist electromagnetic interference from the environment. Eight probes are provided. The multi-channel data receiving module 100 receives the detection data from eight probes 900. Each probe 900 is individually electrically connected to a data receiving unit 110 of the chip SN65HVD77. A self-recovery insurance 610 is electrically connected in each data receiving channel, to ensure that when a short circuit fault occurs in any one of the probes 900 or in a corresponding connection wire, the resistance of the self-recovery insurance 610 for the corresponding interface quickly increases, thereby timely disconnecting the fault circuit to ensure the operation reliability and stability of the electronic system of the inner detector. The number of the probes is not limited to eight.

The data concentration module 200 and the clock management module 400 can be implemented by using a chip EP3C25E144I7N. The chip EP3C25E144I7N can include an FPGA processor, available I/O interfaces with a number up to eight three, 24,624 logic units, and four phase-locked loops (PPL) in total, and the operating temperature of the chip EP3C25E144I7N can reach −40 degrees Celsius to 100 degrees Celsius. The data concentration module 200 is electrically connected to eight channels of data receiving units 110 of the chip SN65HVD77, to receive all detection data. The input clock of the clock management module 400 has a frequency of 50 MHz. A clock for receiving signal having a frequency of 200 MHz and a clock for transmitting signal having a frequency of 50 MHz are generated by two PLLS inside the FPGA. The clock for receiving signal is input to the multi-channel data receiving module 100 and the data concentration module 200. The clock for transmitting signal is input to the single-channel data transmission module 300.

The single-channel data transmission module 300 can adopt the chip SN65HVD77, and is electrically connected to the FPGA processor. The single-channel data transmission module 300 transmits the compressed detection data to the data storage module 800. The self-recovery insurance 620 is electrically connected between the data storage module 800 and the single-channel data transmission module 300. When a short circuit fault occurs in the single-channel data transmission module 300 or in the connection wire, the fault circuit is timely disconnected, to ensure the operation reliability and stability of the data concentration system 10 for the inner detector of the oil-gas pipeline.

The power supply management module 500 provides four different voltages including 5 V, 3.3 V, 2.5 V, and 1.2 V, wherein the voltage dropping chip TPS63133 outputs a power supply voltage of 5 V, and the voltage dropping chip TPS63132 outputs a voltage of 3.3 V. The two chip types are manufactured by Texas Instruments Incorporated, which have low ripple, high efficiency, and a large output current up to 2.5 mA to 3 mA. The voltages of 2.5 V and 1.2 V can be generated by using the chip AMS1117. As shown in FIG. 3, the multi-channel data receiving module 100 is driven by the voltages of 5 V and 3.3 V. The FPGA processor is driven by the voltages of 3.3 V, 2.5 V, and 1.2 V. The single-channel data transmission unit is driven by the voltage 3.3 V. The specific parameters in the embodiment can be adjusted according to the actual requirements. The specific voltage parameters can be adjusted according to the actual requirements.

Figure 4:
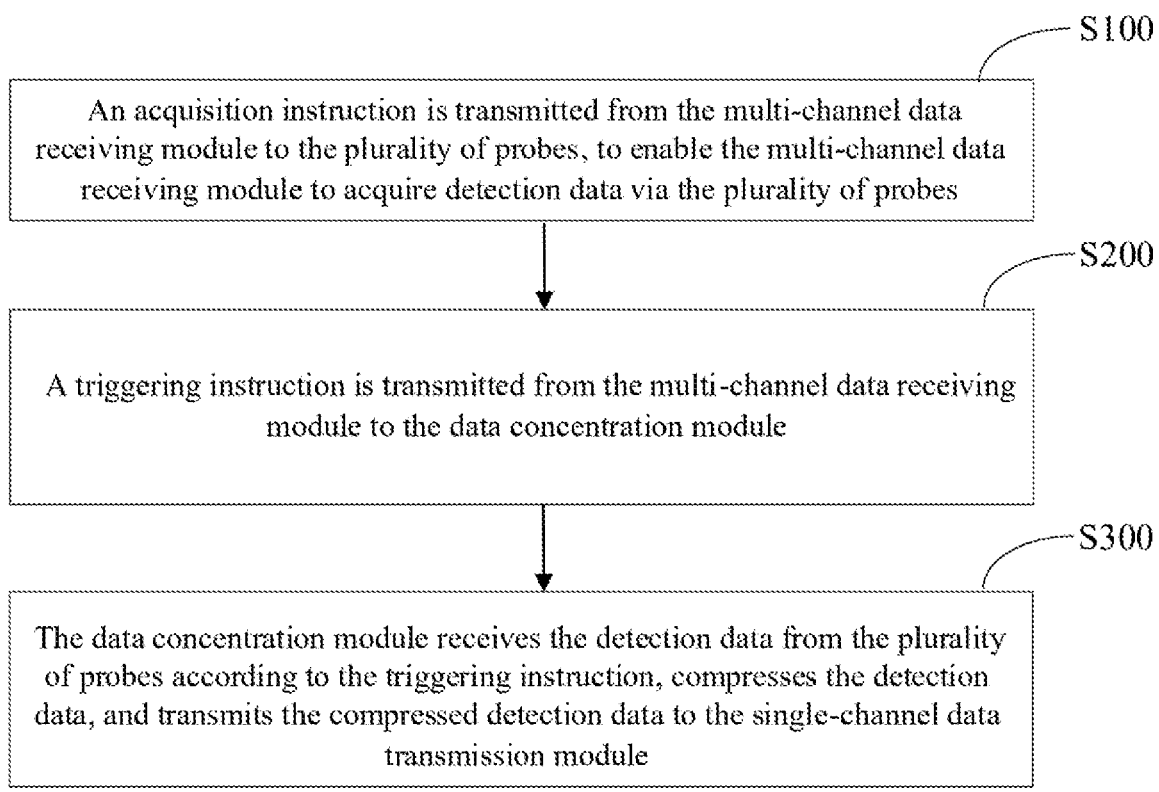
FIG. 4 shows a flow chart of a timing control method of the data concentration system for the inner detector of the oil-gas pipeline according to an embodiment.

Referring to FIG. 4, the present disclosure further provides a timing control method applied to the data concentration system for the inner detector of the oil-gas pipeline of any one of the above-described embodiments. The method includes following steps.

At step S100, an acquisition instruction is transmitted from the multi-channel data receiving module to the plurality of probes, to enable the multi-channel data receiving module acquires detection data via the plurality of probes.

At step S200, a triggering instruction is transmitted from the multi-channel data receiving module to the data concentration module.

At step S300, the data concentration module receives the detection data from the plurality of probes based on the triggering instruction, compresses the detection data, and transmits the compressed detection data to the single-channel data transmission module.

Figure 5:
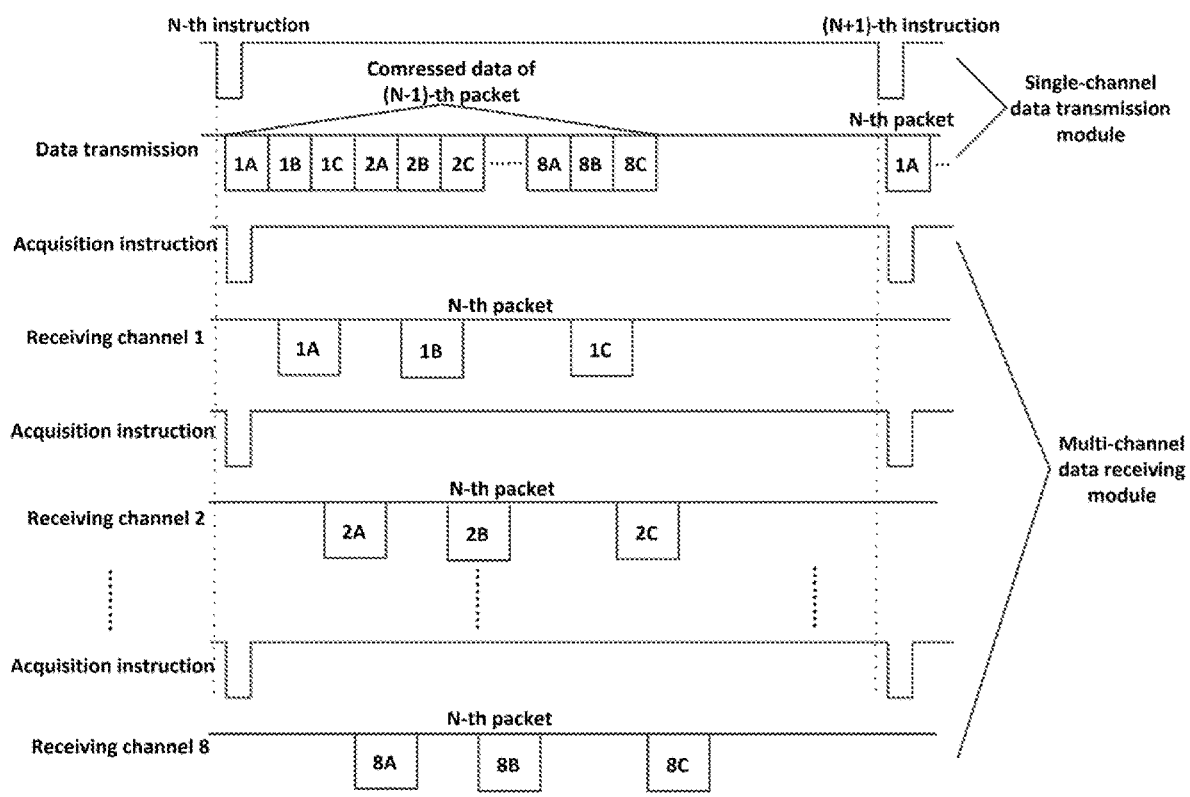
FIG. 5 shows a timing diagram of the data concentration system for the inner detector of the oil-gas pipeline according to an embodiment.

Referring to FIG. 5, FIG. 5 shows a concentration timing diagram of the data concentration device for the inner detector of the oil-gas pipeline, which is provided in the present application.

As shown in FIG. 5, the timing diagram is divided into two parts that include timings for the single-channel data transmission module and timings for the multi-channel data receiving module, wherein the timings for the multi-channel data receiving module includes timings for three channels that respectively are data receiving channels 1, 2, and 8. The timings are for the specific channels that are not limited to the receiving channels 1, 2, and 8.

The timings for the single-channel data transmission module include timings of operation instructions transmitted from the data storage module to the single-channel data transmission module, and timings of sending compressed detection data from the single-channel data transmission module to the data storage module.

Further, the operation instruction is a falling edge of a pulse lasting for a short duration of 10 μs. Each operation instruction can simultaneously trigger three actions. For the first action, the multi-channel data receiving module transmits an acquisition instruction simultaneously to the probes, wherein the acquisition instruction is also a falling edge of a pulse having a duration of 10 μs. For the second action, the multi-channel data receiving module enters a data receiving mode to sequentially receive the acquired detection data from each probe, for example, data 1A, 1B, and 1C received through a first receiving channel. For the third action, the single-channel data transmission module transmits the compressed detection data of the last packet, that is, the compressed detection data of the (N-1)-th packet, to the data storage module.

Then, after the detection data of all probes are received by the multi-channel data receiving module, the data concentration module is triggered to compress the detection data received at this instant. As shown in FIG. 5, after the multi-channel data receiving module receives all the detection data of 1A to 8C, the detection data of the N-th packet received at the instant are compressed, to obtain the compressed detection data of the N-th packet. Further, the compressed detection data of the N-th packet are achieved by sorting and combining the detection data of the N-th packet from all the probes through eliminating gaps between the detection data from each single probe and gaps between the detection data of the plurality of probes. After the compression is completed, the compressed detection data are to be transmitted to the single-channel data transmission module; and wait for a next operation instruction. When the operation instruction is triggered, the single-channel data transmission module transmits the compressed detection data of the N-th packet to the data storage module.

The present application further provides a timing control method applied to the data concentration system 10 for the inner detector of the oil-gas pipeline of any one of the above-described embodiments. The timing control method can make full use of the duration of each operation instruction. Each operation instruction can simultaneously trigger the multi-channel data receiving module to receive the detection data from the probes, and trigger the single-channel data transmission module to transmit the compressed data of the last packet, which ensures that the data receiving and the data compression can be performed independently, thereby avoiding the problem that, after the data are received, the data are compressed and then transmitted in a duration between two operation instructions. Each module is ensured to have enough acquisition time and transmission time, thereby greatly improving the data transmission efficiency.

It should be understood, in several embodiments provided in the present application, the disclosed relevant devices and methods can be implemented in other ways. For example, the device embodiments described above are only exemplary. For example, the division of the modules or units is merely a logical function division, and there may be other division manners in actual implementation. For example, a plurality of units or parts can be combined, or integrated into another system, or several features can be omitted or not implemented. In addition, the mutual coupling, direct coupling or electrical connection illustrated or discussed herein may be implemented through indirect coupling or electrical connection between interfaces, devices or units, and may be in electrical, mechanical or other forms.

The units described as separate components may be physically separated or not. The components illustrated as units maybe physical units or not, that is, may be located in one place, or may be distributed on a plurality of network units. According to actual requirements, all or part of the units can be selected to achieve the purpose of the implementation.

In addition, function units in each embodiment of the present disclosure may be integrated into one processing unit, or each of the units may individually physically exist, or two or more units may be integrated into one unit. The above integrated units can be implemented in the form of hardware or software function units.

Those skilled in the art can understand that all or part of the processes in the methods of the foregoing embodiments can be implemented by using a computer program to instruct related hardware. The program can be stored in a computer-readable storage medium. As described in the embodiments of the present application, the program may be stored in the storage medium of the computer system and executed by at least one processor of the computer system, so as to implement the processes included in the methods of various embodiments described above. The storage medium may be a magnetic disk, a compact disc, a read-only memory (ROM), a random access memory (RAM), or the like.

All technical features of the embodiments described above can be arbitrarily combined. For purpose of simplifying the description, not all arbitrary combinations of the technical features in the embodiments illustrated above are described. However, as long as such combinations of the technical features are not contradictory, these combinations should be considered to be within the scope described by the specification.

The above embodiments merely illustrate several implementations of the disclosure, the description of which is relatively specific and detailed, but should not be construed as limitations to the scope of the present application. It should be noted that various deformations and improvements can be made by those skilled in the art without departing from the concept of the present application, and these deformations and improvements are all within the protection scope of the present application. Therefore, the protection scope of the present application shall be subject to the appended claims.

What is claimed is:

1. A data concentration system for an inner detector of an oil-gas pipeline, comprising:
 a multi-channel data receiving module, electrically connected to a plurality of probes of the inner detector and configured to receive detection data acquired by the plurality of probes;
 a data concentration module, electrically connected to the multi-channel data receiving module, and configured to receive the detection data outputted by the multi-channel data receiving module and compress the detection data; and
 a data transmission module, electrically connected to the data concentration module and configured to receive compressed detection data from the data concentration module;
 wherein, the multi-channel data receiving module adopts a duplex communication mode, and the multi-channel data receiving module is configured to simultaneously transmit an acquisition instruction to the plurality of probes and receive the detection data acquired by the plurality of probes.

2. The data concentration system of claim 1, wherein, the detection data received by the multi-channel data receiving module under an acquisition instruction has a length greater than or equal to 16 bits, and less than or equal to 32*16 bits.

3. The data concentration system of claim 1, wherein the multi-channel data receiving module comprises a differential communication chip.

4. The data concentration module of claim 1, wherein, the multi-channel data receiving module comprises data receiving units; the data receiving units are provided with a plurality of data receiving channels; and each of the plurality of probes is electrically connected to the data receiving unit through a corresponding data receiving channel.

5. The data concentration system of claim 4, further comprising a first self-recovery insurance module electrically connected in the corresponding data receiving unit between each of the plurality of probes and the electrical receiving channel.

6. The data concentration system of claim 5, further comprising a data storage module electrically connected to the data transmission module.

7. The data concentration system of claim 6, wherein, the data transmission module is a single-channel data transmission module; the single-channel data transmission module comprises a data transmission unit; the data transmission unit is electrically connected to the data storage module; and a data transmission mode of the single-channel data transmission module is the duplex communication mode.

8. The data concentration system of claim 7, further comprising a second self-recovery insurance module electrically connected between the data storage device and the data transmission unit.

9. The data concentration system of claim 1, wherein, the data concentration module is a single-chip microcomputer or a field programmable gate array.

10. The data concentration system of claim 1, wherein, the data concentration module compressing the detection data comprises sorting and then combining the detection data; and the detection data are sorted based on sizes or numbers of the detection data.

11. The data concentration system of claim 1, further comprising a clock management module, wherein: the clock management module is electrically connected to the multi-channel data receiving module, the data concentration module, and the data transmission module respectively, and is configured to provide a clock signal respectively for the multi-channel data receiving module, the data concentration module, and the data transmission module.

12. The data concentration system of claim 1, further comprising a power management module, wherein:
 the power management module is electrically connected to the multi-channel data receiving module, the data concentration module, and the data transmission module, and is configured to supply power to the multi-channel data receiving module, the data concentration module, and the data transmission module.

13. A timing control method for the data concentration system of claim 1, comprising:
 transmitting the acquisition instruction from the multi-channel data receiving module to the plurality of probes, to enable the multi-channel data receiving module to acquire the detection data via the plurality of probes;
 transmitting a triggering instruction from the multi-channel data receiving module to the data concentration module;
 receiving, by the data concentration module, the detection data from the plurality of probes according to the triggering instruction, compressing the detection data, and transmitting the compressed detection data to a single-channel data transmission module.

14. The timing control method of claim 13, comprising timings for the single-channel data transmission module and timings for the multi-channel data receiving module.

15. The timing control method of claim 14, wherein, the timings for the multi-channel data receiving module comprise timings for three channels that respectively are data receiving channels 1, 2, and 8.

16. The timing control method of claim 14, wherein, the timings for the single-channel data transmission module comprise: timings of operation instructions transmitted from a data storage module to the single-channel data transmission module, and timings of sending the compressed detection data from the single-channel data transmission module to the data storage module.

17. The timing control method of claim 14, wherein each operation instruction is a falling edge of a pulse lasting for a short duration of 10 μs.

18. The timing control method of claim 16, wherein each operation instruction simultaneously triggers steps of:
 transmitting, by the multi-channel data receiving module, the acquisition instruction simultaneously to the plurality of probes;
 the multi-channel data receiving module entering a data receiving mode to sequentially receive the detection data from each of the plurality of probes;
 transmitting, by the single-channel data transmission module, the compressed detection data of a last packet to the data storage module.

19. The timing control method of claim 18, wherein the acquisition instruction is a falling edge of a pulse having a duration of 10 μs.

* * * * *